UNITED STATES PATENT OFFICE.

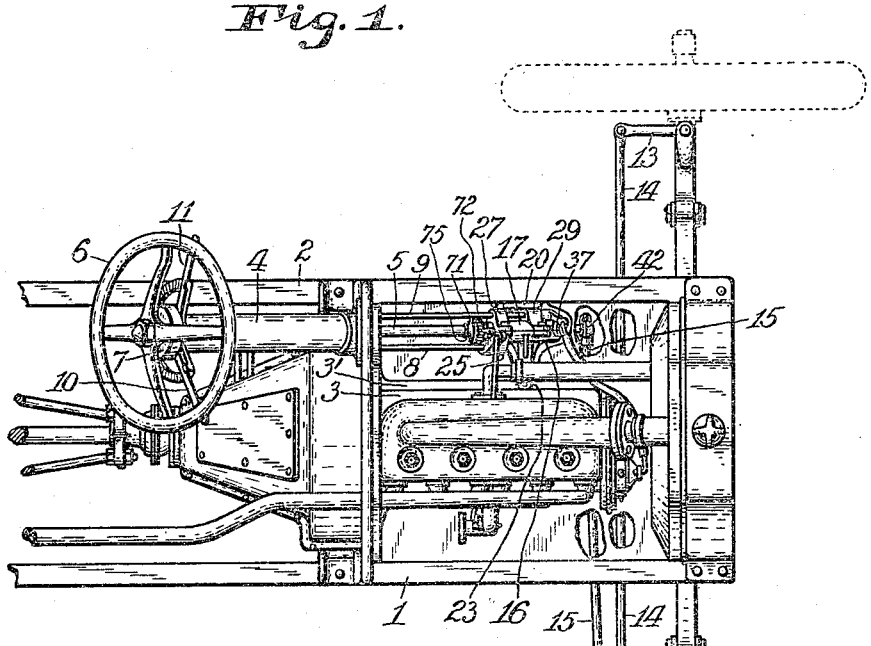

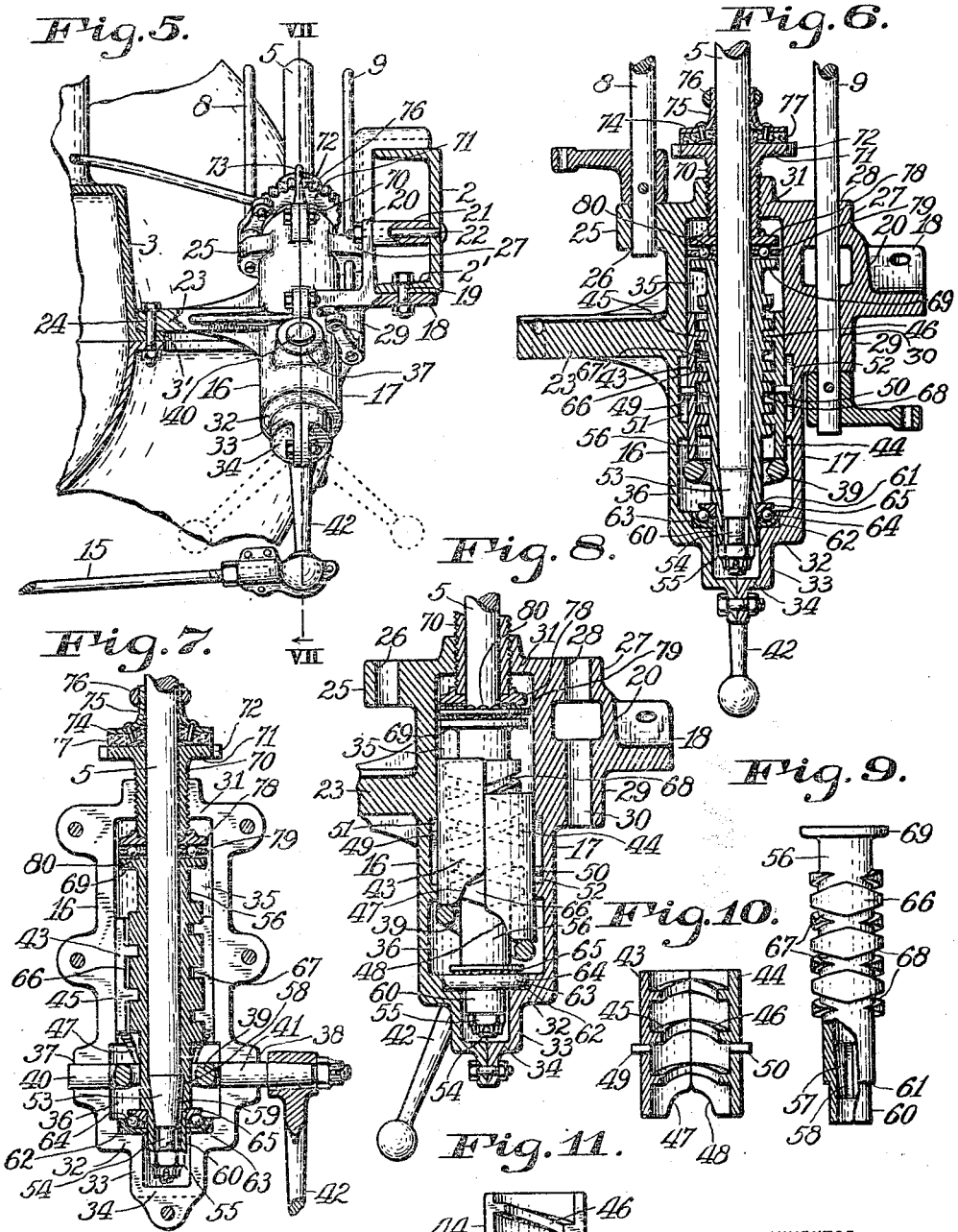

JAMES H. RICHARDS, OF MOSCOW, IDAHO.

AUTOMOBILE STEERING-GEAR.

1,272,103.           Specification of Letters Patent.      Patented July 9, 1918.

Application filed June 4, 1917. Serial No. 172,647.

*To all whom it may concern:*

Be it known that I, JAMES H. RICHARDS, a subject of Great Britain, residing at Moscow, in the county of Latah and State of Idaho, have invented a new and useful Automobile Steering-Gear, of which the following is a specification, reference being had to the accompanying drawings and to the letters and figures of reference marked thereon.

This invention relates to steering mechanism of the type that connects the steering shaft with the steering knuckles in motor vehicle construction, the invention having reference more particularly to steering mechanism that is adapted more especially for use in connection with certain well known motor vehicles of the "Ford" and similar types.

An object of the invention is to provide an improved steering mechanism for motor vehicles that shall be so constructed as to permit the driver or operator to release one or both hands in emergency from the steering wheel without losing guiding control of the motor vehicle. Another object is to provide an improved steering mechanism of such construction as to permit it to be applied to motor vehicles without altering the present construction thereof, excepting to remove the mechanism of the steering gear hitherto provided, and which shall be operated either with or without the planetary gear device commonly provided at the upper end of the steering shaft. A further object is to provide steering mechanism for motor vehicles which shall be of such character as to prevent the vibrations in operation to reverse the gearing when not constantly held by the driver, an aim being to prevent accidents due to deflection of the forward wheels of the vehicle by obstructions or rough roads, which improved steering mechanism shall be of simple and inexpensive yet reliable construction, adapted to be readily applied and be durable and economical in use.

With the above-mentioned and other objects in view, the invention consists in a novel housing adapted to be firmly secured to a motor vehicle frame and engine and having means for steadily supporting the throttle shaft or rod and the timer shaft or rod with which motor vehicles are provided, the housing supporting improved means for operating and controlling the rod by which the steering knuckles are controlled; and the invention consists further in the novel parts and in the combinations and arrangements of parts as hereinafter particularly described and further defined in the accompanying claims.

Referring to the drawings,—Figure 1 is a fragmentary top plan of a familiar type of automobile engine and its frame to which the improved steering mechanism is applied; Fig. 2 is a fragmentary elevation of the automobile frame partially broken away, and a side view of the improved steering mechanism; Fig. 3 is an elevation of the reverse side of the steering mechanism; Fig. 4 is a fragmentary section on the line IV—IV on Fig. 2; Fig. 5 is a fragmentary transverse section of the automobile frame and the engine crank case in connection with which the improved steering mechanism is shown perspectively; Fig. 6 is a longitudinal section of the improved steering mechanism on the line VI—VI on Fig. 2; Fig. 7 is a fragmentary section on the line VII—VII on Fig. 5; Fig. 8 is a fragmentary sectional elevation also on the line VI—VI but with the operating parts in different positions than those shown in Fig. 6; Fig. 9 is an elevation of one of the parts of the improved mechanism; Fig. 10 is a central section reproducing parts of Fig. 6 separately from the remaining mechanism; and, Fig. 11 is an elevation of the inner side of one of the parts shown in Fig. 10.

Similar reference characters on the various figures of the drawings indicate corresponding elements or features of constructions herein referred to.

For the purpose of fully and clearly explaining the invention and its peculiar adaptability to motor vehicles, a number of the well known parts or portions of the construction of the motor vehicle will be briefly referred to, the same comprising channel section frame members 1 and 2 having each inwardly extending flange portions 2', an engine crank case 3 having flanges 3' whereby the parts of the crank case are secured together, a steering column 4 in which a steering shaft 5 is guided and provided with a hand steering wheel 6 which commonly is connected with the steering shaft by means of planetary gearing arranged in a gear case 7 at the top of the steering column as hitherto constructed. The steering wheel rotates at a higher rate than the steering shaft, but for the purposes of the present invention the steering wheel may be directly connected with the steering shaft so as to reduce the rate of rotation of the steering wheel advantageously. The motor vehicle includes also a throttle shaft or rod 8 and a timer shaft or rod 9 provided respectively with controlling levers 10 and 11, as will be understood. The motor vehicle has also steering knuckles provided with arms 12 and 13 respectively that are connected to a coupling rod 14 to which, in the present case, a steering rod 15 is connected in a well known manner. The steering shaft 5 is, as is well known, arranged at an inclination with its lower end between the engine and one of the frame members or bars 2 and relatively nearer to the latter.

The improved steering mechanism or gearing comprises a housing which is composed of two parts 16 and 17 suitably secured together so as to be readily applied to the lower portion of the steering shaft after removing the mechanism whereby the shaft 5 may have been originally connected with the steering rod 15. The part 17 of the housing has an integral lateral supporting wing 18 thereon that is relatively oblique angled so as to have a bearing against the bottom flange 2' of the frame bar 2 and is secured thereto by means of a bolt 19, the wing having a right angled upwardly extending ear 20 thereon which bears against the edge of the flange and has a spacing block or thimble 21 which extends from the ear to the main or vertical portion of the side bar 2, the spacing block and the ear being firmly secured in place by means of a bolt 22. The part 16 of the housing has a lateral supporting arm 23 integral therewith and so as to be on the opposite side of the housing from the supporting wing, the arm having a relatively oblique angled under side that is supported upon the flange 3' of the crank case 3 and secured thereto by means of a bolt 24, the arm being relatively longer than the supporting wing. The part 16 has also a boss 25 thereon adjacent to the upper end of the housing and in proximity to the arm 23, the boss having a guide bore 26 which receives the throttle shaft or rod 8 to firmly steady it and prevent vibrations and rattling. On the opposite side of the housing the part 17 has a boss 27 integral thereon which has a guide bore 28 therein, the part having also another boss 29 having a guide bore 30 therein, the bosses being on opposite sides respectively of the supporting wing 18, the guide bores being in alinement each with the other and receiving and guiding the timer shaft or rod 9. The upper end of the housing has an apertured head 31 therein, the lower end having an apertured head 32 which has a cylindrical extension 33 having a head 34, the head 32 and the extension being bored. The housing has a longitudinal guide bore 35 and at the lower end thereof a counterbore 36, the opposite portions of the counterbored wall of the housing being provided with bearing portions 37 and 38. An annular rock-lever 39 is arranged in the counterbore and has trunnions 40 and 41 on opposite portions thereof that are supported in the bearing portions 37 and 38 respectively, one of the trunnions extending beyond the housing wall and having a steering arm 42 secured thereto that is suitably connected to the steering rod 15.

For the purpose of directly controlling the rock-lever 39 a pair of push blocks 43 and 44 are provided which are fitted together and longitudinally guided in the guide bore 35. The push blocks are constructed as half nuts which together form a hollow cylinder and have cam devices 45 and 46 on their inner sides which preferably are formed as sections of screw threads, one being right hand and the other left hand pitch. The edges of the lower portions of the push blocks have recesses 47 and 48 respectively to afford clearance to permit the rock-lever to operate, the middle portions of the lower ends of the push blocks being in contact with the rock-lever on opposite sides respectively of its trunnions. The push blocks are suitably guided to prevent them from turning in the housing and preferably are provided with guide pins or spline devices 49 and 50 that extend into longitudinal guide grooves or spline ways 51 and 52 respectively that extend from the guide bore 35 into the wall of the housing, one guide groove being in the part 16 and the other in the part 17.

The steering shaft 5 has a tapering portion 53 near its lower end from which extends a screw-threaded stud portion 54 having a nut 55 thereon. A cam sleeve 56 is placed on and embraces the steering shaft and has a tapering portion 57 that is fitted to the tapering portion 53 of the shaft, the tapering portion 57 having a key way 58 therein that receives a key 59 which secures the sleeve to the shaft. The cam sleeve has an extension 60 thereon that is slightly less in external diameter than the main portion of the sleeve so as to provide a shoulder 61. The stud portion 54 extends through the extension 60 and the end of the latter is engaged by the nut 55. The end of the stud portion 54 is close to the head 34 and may be proportioned as to length so as to find support on the head, while the extension 60 may obviously be proportioned as to diameter so as to have lateral support in the head 32 and the extension 33. Preferably the inside of the head 32 has an annular recess 62 in which a cup or ball race 63 is seated and supports bearing balls 64 which support a bearing cone 65 that is seated against the shoulder 61 and tightly embraces the extension 60. The cam sleeve 56 has a main portion 66 that is relatively larger in diameter than the remaining portions and has suitable cam grooves therein which preferably are formed as screw thread grooves 67 and 68, right hand and left hand pitch respectively, that receive the threads or cam devices 45 and 46 respectively, so that when the sleeve is turned rotatably to and fro, the push blocks are alternately forced downward on the rock-lever. The upper end of the cam sleeve has a flange 69 thereon so as to provide an end-bearing which is opposed to the inner end of the bearing box 70 which is screwed into the head 31 of the housing so as to be adjustable and resist the end thrust of the cam sleeve. The bearing box has a flange 71 on its outer end that has peripheral notches 72 therein to receive a spring-latch 73 that is mounted upon the upper portion of the housing so as to prevent accidental rotation of the bearing box when adjusted. Preferably a dust-collar 74 having a neck 75 and composed of stamped sheet metal is arranged on the steering shaft 5 and secured thereto by means of a clamp ring 76 driven onto the neck, the collar having a fabric swab or wiper 77 secured thereto in contact with the outer end of the journal box 70 to prevent dust from entering the bearing box around the shaft. Preferably the inner end of the bearing box 70 has a bearing plate 78 connected or secured thereto, a ball case 79 being arranged between the bearing plate and the flange 69 of the cam sleeve and guiding bearing balls 80 arranged also between the plate and the flange. In case of lost motion developing so that the bearing balls 64 permit play at the lower end of the steering shaft, the shaft may be steadied as above-mentioned in the extension 33, and longitudinal lost motion may be taken up by the adjustable bearing box 70, as will be understood.

In practical use the steering wheel 6 is turned as is customary and the steering shaft 5 thereby caused to be turned as may be required so as to turn the cam sleeve 56 which controls and operates the push blocks 43 and 44 as designed, the consequent tilting of the rock-lever causing the arm 42 to be swung in the required direction to move the steering rod 15. In case the motor vehicle meets obstruction in the road so as to tend to thrust the knuckle arms 12 and 13 to one side or the other, it is evident that the accident is prevented because of the push blocks 43 and 44 being locked to the cam sleeve 56 which in turn is prevented from being moved longitudinally in the housing, the driver thus having complete control of the steering operations and without being required to keep both of his hands tight on the steering wheel 6.

Having thus described the invention, what is claimed as new is—

1. A motor-vehicle steering mechanism including a housing having a lateral supporting arm on one side and a similar supporting wing on the opposite side thereof, the wing being relatively shorter than the arm and having a relatively right angled supporting ear thereon, a rock-shaft mounted in the housing, a steering arm secured to the rock-shaft, a steering shaft rotatively guided in the housing, and means in the housing having operative connection with the steering shaft and the rock-shaft to enable the former to control the latter.

2. A motor-vehicle steering mechanism including a housing having a longitudinal guide bore therein, a lateral supporting arm integral with one side of the housing, a lateral supporting wing integral with the opposite side of the housing and having a relatively right-angled supporting ear thereon, a rock-lever mounted in the housing and having a steering arm thereon, a steering shaft rotatively guided in the housing, a cam sleeve in the housing secured to the shaft, and a pair of push-blocks guided in the guide-bore and contacting with opposite portions respectively of the rock-lever, the push-blocks being engaged by the cam sleeve to be alternately actuated thereby.

3. A motor-vehicle steering mechanism including a housing having a lateral supporting arm on one side thereof and also a guide boss adjacent to the arm, the boss being near to one end of the housing and having a guide bore therein extending longitudinally of the housing, a supporting wing integral with the opposite side of the housing, a steering shaft rotatively guided in the said end portion of the housing, a cam sleeve secured to the shaft and rotatively guided in the opposite end of the housing, two push-blocks longitudinally guided in the housing and engaged by the cam sleeve to be alternately actuated thereby, a rock-lever mounted in the housing in contact with the opposite portions of the rock-lever, and a steering arm secured to the rock-lever.

4. A motor-vehicle steering mechanism including a housing having a lateral supporting wing on one side thereof and also two guide bosses adjacent to opposite portions of the wing, each boss having a guide bore therein alining with the bore of the other boss, the wing having a right-angled supporting ear thereon extending adjacent to one of the bosses, a supporting arm integral with the opposite side of the housing, a rock-lever mounted in the housing, a steering arm secured to the rock-lever, a steering shaft rotatively guided in the housing, a cam sleeve rotatively guided in the housing and secured to the steering shaft, and a pair of push-blocks engaged by the cam sleeve and longitudinally guided in the housing in contact with the rock-lever.

5. A motor-vehicle steering mechanism including a housing having a longitudinal guide bore therein, a pair of push-blocks movably guided longitudinally in the guide bore, an annular lever in the guide bore in contact with the push-blocks and having trunnions mounted in the wall of the housing, one of the trunnions extending beyond the wall and having a steering arm secured thereto, a cam sleeve arranged between the push-blocks and having one end guided in one end of the housing, the sleeve extending through the annular lever and having right and left cam devices thereon engaging the push-blocks respectively, and a steering shaft extending into the housing and secured to the cam sleeve, the shaft rotatively guiding the opposite end of the cam sleeve relatively to the housing.

6. A motor-vehicle steering mechanism including a housing composed of two sections, one of the sections having a lateral supporting wing and also two guide bosses thereon, the other of the sections having a supporting arm and also a guide boss thereon, two sections being detachably secured together, one end of the housing having a step-bearing therein, a bearing box screwed into the opposite end of the housing and having a notched flange on its outer end, a latch mounted on the housing and contacting the flange, a cam sleeve rotatively guided at one end in the step-bearing, the opposite end of the sleeve having an end-bearing, a bearing plate secured to the inner end of the bearing box, bearing balls arranged between the end-bearing and the bearing plate, a steering shaft rotatively guided in the bearing box and extending into and secured to the cam sleeve, a pair of push-blocks longitudinally guided in the housing and engaged by the cam sleeve to be alternately actuated thereby, and a steering device movably mounted in the housing and controlled by the push-blocks.

7. In a motor-vehicle steering mechanism, the combination of a housing having a guide bore therein and a counterbore extending from the guide bore to one end portion of the housing, said end portion being provided with a head having a cylindrical extension that also has a head therein, the head of the housing and the extension being bored, the guide bore having longitudinal guide grooves therein, an annular rock-lever in the counterbore and having trunnions supported in the wall of the housing, one of the trunnions extending through the wall and having a steering arm thereon, a cam sleeve in the housing extending through the rock-lever and into the bore of the extension of the housing head and having right and left pitched grooves in its periphery, a ball-race seated in said housing head, bearing balls on the ball-race, a bearing cone secured to said sleeve at a short distance from one end thereof and seated on said balls, two push-blocks guided in said guide bore and contacting respectively with opposite portions of said rock-lever, the push-blocks having guide-pins thereon extending into said guide grooves respectively, the inner faces of the push-blocks having right and left screw-threads thereon extending into the right and left pitched grooves respectively, bearing-balls arranged on the opposite end of the cam sleeve, a bearing-box screwed into the opposite end of the housing and having a notched flange on its outer end, a bearing plate secured to the inner end of the bearing box and contacting with said last-mentioned bearing balls, a latch mounted on the housing and contacting with said notched flange, a steering shaft extending rotatively through said bearing box and the cam sleeve and secured to the sleeve, a dust-collar secured to the steering shaft adjacent to the outer end of the bearing box, and a swab secured to said collar and contacting with said end of the bearing box.

In testimony whereof, I affix my signature in presence of two witnesses.

JAMES H. RICHARDS.

Witnesses:
Jos. J. De Conick,
L. E. Vedder.

Copies of this patent may be obtained for five cents each, by addressing the "Commissioner of Patents, Washington, D. C."